(12) United States Patent
Yamauchi et al.

(10) Patent No.: US 6,189,604 B1
(45) Date of Patent: Feb. 20, 2001

(54) HEAT EXCHANGER FOR INSIDE/OUTSIDE AIR TWO-PASSAGE UNIT

(75) Inventors: Yoshiyuki Yamauchi, Aichi-gun; Osamu Kobayashi, Chiryu; Ken Yamamoto, Obu, all of (JP)

(73) Assignee: Denso Corporation, Kariya (JP)

( * ) Notice: Under 35 U.S.C. 154(b), the term of this patent shall be extended for 0 days.

(21) Appl. No.: 09/484,832

(22) Filed: Jan. 18, 2000

(30) Foreign Application Priority Data

Jan. 19, 1999 (JP) ................................................ 11-010214

(51) Int. Cl.[7] ................................ F28D 7/10; F28F 9/26; F28F 9/22
(52) U.S. Cl. .......................... 165/140; 165/143; 165/144; 165/145
(58) Field of Search .................................. 165/140, 143, 165/144, 145, 174

(56) References Cited

U.S. PATENT DOCUMENTS

| | | | |
|---|---|---|---|
| 5,205,347 | * 4/1993 | Hughes | 165/144 |
| 5,333,470 | * 8/1994 | Dinh | 165/140 |
| 5,348,081 | * 9/1994 | Halstead et al. | 165/144 |
| 5,582,241 | * 12/1996 | Yoho et al. | 165/153 |
| 6,021,846 | * 2/2000 | Sasaki et al. | 165/144 |

FOREIGN PATENT DOCUMENTS

| | | | |
|---|---|---|---|
| 2113819 | * 8/1983 | (GB) | 165/140 |
| 10-226219 | 8/1998 | (JP) . | |

* cited by examiner

Primary Examiner—Ira S. Lazarus
Assistant Examiner—Tho Duong
(74) Attorney, Agent, or Firm—Harness, Dickey & Pierce, PLC

(57) ABSTRACT

A heat exchanger in which refrigerant flows has a first core portion disposed in a first air passage for exchanging heat with inside air and a second core portion for exchanging heat with outside air. The second core portion is disposed at a downstream side of the first core portion in a refrigerant flow direction. Accordingly, refrigerant exchanges heat with inside air, first, and then exchanges heat with outside air, a temperature of which is lower than that of inside air. Further, refrigerant flows to form an opposed flow with respect to an air flow direction in the respective first and second core portions. As a result, heating performance of the heat exchanger is improved.

5 Claims, 3 Drawing Sheets

HEAT EXCHANGER FOR INSIDE/OUTSIDE AIR TWO-PASSAGE UNIT

CROSS REFERENCE TO RELATED APPLICATION

This application is based upon and claims the benefit of Japanese Patent Application No. 11-10214, filed on Jan. 19, 1999, the contents of which are incorporated herein by reference.

BACKGROUND OF THE INVENTION

1. Field of the Invention

This invention relates to a heat exchanger for exchanging heat between air and medium flowing in an air-conditioning unit, and particularly to an automotive interior heat exchanger for heating inside air and outside air flowing in an inside/outside air two-passage unit.

2. Description of the Related Art

An inside/outside air two-passage unit has been proposed to exhibit a clouding prevention performance and a heating performance simultaneously in a compartment of a vehicle. The inside/outside air two-passage unit has first and second air passages, which are air-tightly separated from each other by an intermediate partition plane.

Inside air is sucked from the compartment into the first air passage through an inside air inlet, passes through a heat exchanger for heating, and is blown out of the first air passage into the compartment through a foot outlet. Outside air is sucked from a vehicle outside into the second air passage through an outside air inlet, passes through a heat exchanger for heating, and then is blown out of the second air passage into the compartment through a defroster outlet or a face outlet.

Inside air, which has been heated, is re-heated by the heat exchanger, and is blown from the foot outlet toward a foot portion of a passenger in the compartment. Accordingly, the heating performance in the compartment is improved. At the same time, outside air having humidity lower than that of inside air is heated by the heat exchange, and is blown from the defroster outlet toward a windshield. Accordingly, the windshield is prevented from being clouded, thereby improving the clouding prevention performance.

An interior condenser (or an interior gas cooler) 110 shown in FIGS. 5 and 6 can be used as the heat exchanger for heating described above. The interior condenser 110 is installed in a case 100 of an inside/outside air two-passage unit. The case 100 defines therein a first air passage 101 in which inside air flows and a second air passage 102 in which outside air flows. The condenser 110 has upstream side and downstream side first core portions 111, 112 for exchanging heat between refrigerant and inside air flowing in the first air passage 101, and upstream side and downstream side second core portions 113, 114 for exchanging heat between refrigerant and outside air flowing in the second air passage 102.

Refrigerant discharged from a compressor with high temperature enters the condenser 110 from an inlet side refrigerant passage 115 defined in an inlet pipe, and flows in the downstream side second core portion 114 and in the downstream side first core portion 112 in this order. Then, refrigerant flows into the upstream side first core portion 111 from the downstream side first core portion 112 through a communication pipe 116, enters the upstream side second core portion 113, and then flows out of the condenser 110 through an outlet side refrigerant passage 117 defined in an outlet pipe.

In the condenser 110, refrigerant heats inside air flowing in the first air passage 101 with room temperature (for example, 25° C.) by exchanging heat when it flows in the downstream side first core portion 112 and the upstream side first core portion 111. Refrigerant further heats outside air flowing in the second air passage 102 with low temperature (for example, −20° C.) by exchanging heat when it flows in the downstream side second core portion 114 and the upstream side second core portion 113.

In the condenser 110, however, heat exchange between high temperature refrigerant and low temperature outside air is performed first. After that, heat exchange between intermediate temperature refrigerant and room temperature inside air is performed. Further, refrigerant flows in a direction approximately perpendicular to outside air and inside air directions. Therefore, a temperature efficiency ratio is insufficient when refrigerant exchanges heat with inside air and outside air, so that sufficient heating performance cannot be exhibited to the compartment.

SUMMARY OF THE INVENTION

The present invention has been made in view of the above problem. An object of the present invention is to improve a heating performance of a heat exchanger for an inside/outside air two-passage unit, by increasing a temperature efficiency ratio when heat exchange between refrigerant and inside/outside air is performed.

According to the present invention, a heat exchanger has a first core portion disposed in a first air passage for exchanging heat between thermal medium flowing therein and inside air, and a second core portion disposed in a second air passage for exchanging heat between the thermal medium flowing therein and outside air. The second core portion is disposed at a downstream side of the first core portion in a thermal medium flow direction in which the thermal medium flows. Accordingly, the thermal medium exchanges heat with inside air, first, in a state where the thermal medium has a high temperature. After that, the thermal medium exchanges heat with outside air, a temperature of which is lower than that of inside air. As a result, a temperature efficiency ratio when the thermal medium exchanges heat with inside/outside air is increased, resulting in improved heating performance.

Preferably, the first core portion has a first part and a second part disposed at a downstream side of the first part in the thermal medium flow direction and at an upstream side of the first part in an inside air flow direction. Preferably, the second core portion has a third part and a fourth part disposed at a downstream side of the third part in the thermal medium flow direction, and at an upstream side of the third part in an outside air flow direction. Accordingly, the thermal medium forms an opposed flow with respect to the air flow direction in the respective first and second core portions, resulting in further improvement of the heating performance.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS (First Embodiment)

Figure 1:
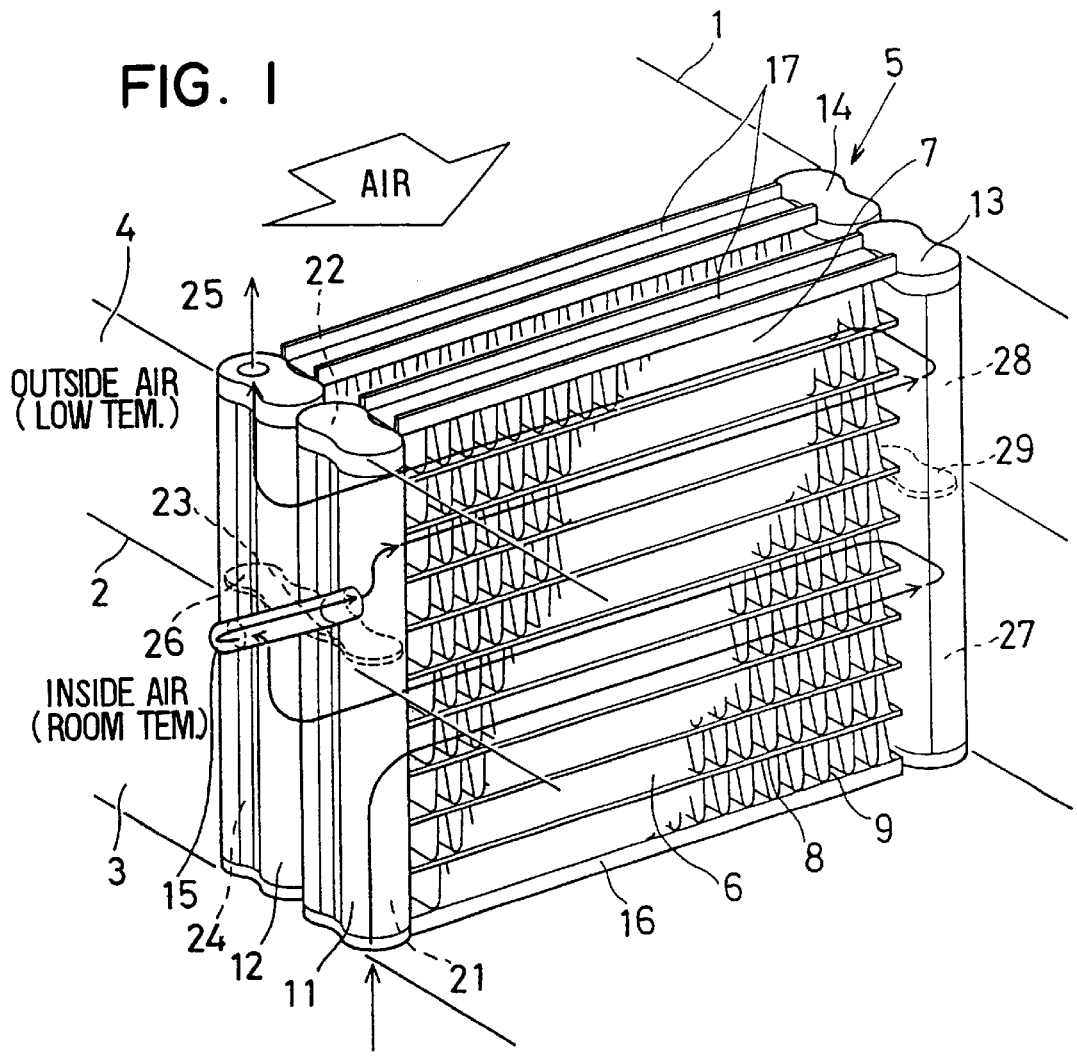
FIG. 1 is a perspective view showing a main structure of an inside/outside two-passage unit in a first preferred embodiment.
Figure 2:
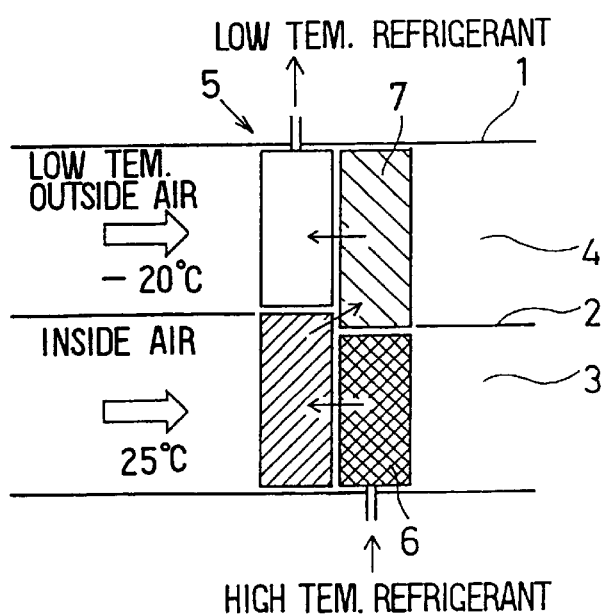
FIG. 2 is a schematic view showing a refrigerant flow direction in a heat exchanger in the first embodiment.

A first preferred embodiment of the present invention is explained referring to FIGS. 1 and 2. An air conditioner in the first embodiment is installed in a front side compartment of a vehicle, and has an inside/outside air two-passage unit (air conditioning unit), which defines air passages for conducting conditioned air into the compartment. The inside/outside air two-passage unit includes an inside/outside air switching system, a centrifugal fan, and an outlet switching system connected in this order from an air upstream side.

The inside/outside air switching system is composed of an inside/outside air switching box (not shown) and plural switching doors (not shown) rotatably attached to the switching box, for sucking both or one of air inside the compartment (inside air) and air outside the compartment (outside air). The switching box has an inside air inlet and an outside air inlet. The plural switching doors are driven by an actuator such as a servo motor to select an inlet mode.

The inlet mode is selected from an inside air circulation mode in which the inside air inlet is fully opened and the outside air inlet is fully closed, an outside air introduction mode in which the outside air inlet is fully opened and the inside air inlet is fully closed, and an inside/outside air two-passage mode in which both the inside air inlet and the outside air inlet are fully opened.

The centrifugal blower is disposed in the inside/outside air switching box, and is composed of first and second centrifugal fans held in first and second scroll casings and a blower motor for driving the first and second centrifugal fans.

An air conditioning case 1 constructing the outlet switching system therein is, as shown in FIG. 1, divided by an intermediate partition plate 2 into a first air passage 3 in which inside air mainly flows and a second air passage 4 in which outside air mainly flows. A heat exchanger 5 for heating, which is a part constituting a refrigerating cycle or $CO_2$ cycle installed in a vehicle, is disposed across the first and second air passages 3, 4.

The refrigerating cycle or the $CO_2$ cycle is composed of the heat exchanger 5 for serving as an internal condenser or an internal gas cooler, a decompressing member such as an expansion valve, an exterior heat exchanger such as an exterior evaporator, an accumulator, and a refrigerant compressor. The compressor equips an electromagnetic clutch for interrupting an rotational power to the compressor from an engine of the vehicle.

The first air passage 3 is an inside air passage (inside air layer) connected to an air downstream side of the first scroll casing of the centrifugal blower. Inside air sucked into the first air passage 3 from the inside air inlet is blown into the compartment from a foot (FOOT) outlet (not shown) after passing through a heat exchanger for cooling and the heat exchanger 5 for heating. The second air passage 4 is an outside air passage (outside air layer) connected to an air downstream side of the second scroll casing of the centrifugal fan. Outside air sucked into the second air passage 4 from the outside air inlet is blown into the compartment from a defroster (DEF) outlet (not shown) or a face (FACE) outlet (not shown) after passing through the heat exchanger for cooling of the heat exchanger 5 for heating.

The FOOT outlet blows hot air toward a foot portion of a passenger. The DEF outlet blows hot air toward an inner surface of a windshield, and the FACE outlet blows hot air toward a cephalothorax (upper) portion of the passenger. Each of the outlets is selectively opened/closed in accordance with an outlet mode, by driving the actuator to operate the outlet switching doors. The outlet mode is selected from a face (FACE) mode, a bi-level (B/L) mode, a foot (FOOT) mode, a foot-defroster (F/D) mode, and a defroster (DEF) mode, Next, the exchanger 5 for heating is briefly explained with reference to FIGS. 1 and 2. FIG. 2 is a diagram showing a flow direction of refrigerant in the heat exchanger 5. The heat exchanger 5 is a U-turn type interior heat exchanger for the inside/outside air two-passage unit, and is installed in the inside/outside air two-passage unit. The heat exchanger 5 constitutes an interior condenser in the refrigerating cycle in which refrigerant (for example, R134a) circulates, otherwise constitutes an interior gas cooler in the $CO_2$ cycle in which refrigerant (for example $CO_2$ gas) circulates.

The heat exchanger 5 is composed of a heat exchanger body including a first core portion 6 and a second core portion 7, a pair of downstream side and upstream side headers 11, 12 connected to an end portion in the width direction of the heat exchanger body as a first side tank, and a pair of downstream side and upstream side headers 13, 14 connected to the other end portion in the width direction of the heat exchanger body as a second side tank. The first core portion 6 performs heat exchange between inside air and refrigerant, and the second core portion 7 performs heat exchange between outside air and refrigerant. The downstream side and upstream side headers 11, 12 communicate with each other through a communication pipe 15. The downstream side and upstream side headers 13, 14 communicate with each other through two communication pipes (not shown).

The first core portion 6 is composed of a first group of tubes arranged in several files in a height direction of the heat exchanger 5, and is disposed in the first air passage 3 defined in the air conditioning case 1. The second core portion 7 is composed of a second group of tubes arranged in several files in the height direction of the heat exchanger 5, and is disposed in the second air passage 4 defined in the air conditioning case 1 as well. The first and second groups of tubes are arranged in two files in a depth direction (air flow direction) of the heat exchanger 5.

The first group of tubes is composed of, for example, five tubes 8. The five tubes 8 are divided into a first half group of tubes in which refrigerant flows from a first end of the first core portion 6 in the width direction to a second end of the first core portion 6, and a second half group of tubes in which refrigerant flows to return from the second end of the first core portion 6 to the first end. The second half group of tubes is disposed at the air upstream side of the first half group of tubes. Air (mainly inside air) flowing outside the first half and second half groups of tubes is heated by exchanging heat with refrigerant flowing inside the first half and second half groups of tubes.

The second group of tubes is composed of, for example, four tubes 8. The four tubes 8 are divided into a third half group of tubes in which refrigerant flows from a first end in a width direction of the second core portion 7 to a second end of the second core portion 7, and a fourth half group of tubes in which refrigerant flows to return from the second end of the second core portion 7 to the first end. The fourth half group of tubes is disposed at the air upstream side of the third half group of tubes. Air (mainly outside air) flowing outside the third half and fourth half groups of tubes is heated by exchanging heat with refrigerant flowing inside the third half and fourth half groups of tubes.

Each of the tubes 8 is formed from an aluminum alloy member (clad member) covered with brazing filler metal, and shaped into a flat tube. Corrugated fins 9 made of aluminum alloy are disposed between the tubes 8 adjacent to each other and joined thereto by brazing, for enhancing a heat exchanging (radiation) property. Side plates 16, 17 are brazed to both ends of the first half and third half groups of tubes in a height direction to support air downstream side end portions of the first and second core portions 6, 7. The side plates 16, 17 have an approximately U shape in cross-section, respectively.

Each of the downstream side and upstream side headers 11, 12 is composed of a cylindrical portion having an elliptic cross-sectional shape, a central portion of which is recessed, and caps for closing both opening ends of the cylindrical portion. The downstream side header 11 is disposed at the air downstream side of the upstream side header 12. The downstream side header 11 is connected to an inlet pipe not shown at a lower end portion in the height direction thereof, and serves as an inlet tank that conducts refrigerant from the inlet pipe into the heat exchanger body. The upstream side header 12 is connected to an outlet tank not shown at an upper end portion in the height direction thereof, and serves as an outlet tank that discharges refrigerant from the heat exchanger body into the outlet pipe.

An inner space of the downstream side header 11 is divided by a separator 23 into a first inlet chamber 21 communicating with inlet portions of the first half group of tubes, and a second inlet chamber 22 communicating with inlet portions of the third half group of tubes. An inner space of the upstream side header 12 is divided by a separator 26 into a first outlet chamber 24 communicating with outlet portions of the second half group of tubes, and a second outlet chamber 25 communicating with outlet portions of the fourth half group of tubes.

Each of the downstream side and upstream side headers 13, 14 is, as well as the downstream side and upstream side headers 11, 12, composed of a cylindrical portion having an elliptic cross-sectional shape, a central portion of which is recessed, and caps for closing both opening ends of the cylindrical portion. The downstream side and upstream side headers 13, 14 serve as intermediate tanks. The downstream side header 13 is disposed at the air downstream side of the upstream side header 14.

An inner space of the downstream side header 13 is divided by a separator 29 into a first intermediate chamber 27 communicating with outlet portions of the first half group of tubes, and a second intermediate chamber 28 communicating with outlet portions of the third half group of tubes. An inner space of the upstream side header 14 is divided by a separator (not shown) into a first intermediate chamber communicating with inlet portions of the second half group of tubes, and a second intermediate chamber communicating with inlet portions of the fourth half group of tubes.

The communication pipe 15 forms a passage connecting the first outlet chamber 24 of the upstream side header 12 and the second inlet chamber 22 of the downstream side header 11. The communication pipe 15 protrudes from the downstream side and upstream side headers 11, 12 outwardly in the width direction of the heat exchanger 5. One of the other two communication pipes described above connects the first intermediate chamber 27 of the downstream side header 13 and the first intermediate chamber of the upstream side header 14 by a passage defined therein. The other communication pipe connects the second intermediate chamber 28 of the downstream side header 13 and the second intermediate chamber of the upstream side header 14 by a passage defined therein. The two communication pipes also protrude outward from the downstream side and upstream side headers 13, 14 in the width direction of the heat exchanger 5.

Next, operation of the inside/outside air two-passage unit of the automotive air conditioner in the present embodiment is explained with reference to FIGS. 1 and 2.

In a winter season, the inside/outside two-passage mode is selected as the inlet mode and the F/D mode is selected as the outlet mode to heat inside the compartment and to prevent clouding of the windshield. As soon as the blower motor of the centrifugal fan is energized, the first centrifugal fan starts to rotate by the blower motor. Accordingly, inside air is sucked into the first scroll casing through the inside air inlet. Outside air is sucked into the second scroll casing through the outside air inlet by rotation of the second centrifugal fan. Accordingly, as show in FIGS. 1 and 2, inside air having a relatively high temperature (approximately equal to the room temperature, set temperature, of, for example, approximately 25° C.) flows in the first air passage 3. Outside air having a relatively low temperature (outside temperature of, for example, approximately −20° C.) flows in the second air passage 4.

On the other hand, when the electromagnetic clutch is turned on to operate the compressor, the compressor decompresses refrigerant sucked therein and discharges high-temperature and high-pressure refrigerant. High-temperature and high-pressure refrigerant discharged from the compressor flows into the first inlet chamber 21 of the downstream side header 11 of the heat exchanger 5 via a refrigerant pipe and the inlet pipe.

Refrigerant conducted into the first inlet chamber 21 flows into the first outlet chamber 24 of the upstream side header 12 after passing through the first half group of tubes, the first intermediate chamber 27 of the downstream side header 13, the communication pipe, the first intermediate chamber of the upstream side header 14, the second half group of tubes in this order. Refrigerant conducted into the first outlet chamber 24 of the upstream side header 12 flows into the second inlet chamber 22 of the downstream side header 11 through the communication pipe 15.

Then, refrigerant flows in the third half group of tubes, the second intermediate chamber 28 of the downstream side header 13, the communication pipe, the second intermediate chamber of the upstream side header 14, and the fourth half group of tubes in this order, and flows into the second outlet chamber 25 of the upstream side header 12. Refrigerant then flows out of the second outlet chamber 25 toward the decompressing member such as an expansion valve through the outlet pipe and a refrigerant pipe.

Refrigerant exchanges heat with high temperature inside air flowing the first air passage 3 to heat inside air when it passes through in the first half group and second half group of tubes. Refrigerant further exchanges heat with low temperature outside air flowing the second air passage 4 to heat outside air when it passes through the third half group and fourth half group of tubes.

Accordingly, high temperature inside air, which has been heated, is reheated by the first core portion 6 of the heat exchanger, and then is blown toward the foot portion of the passenger from the FOOT outlet to heat inside the compartment. As a result, the heating performance to the compartment is improved. On the other hand, outside air having humidity lower than that of inside air is heated at the second core portion 7 of the heat exchanger 5, and is blown toward the inner surface of the windshield from the DEF outlet. As a result, the clouding prevention performance to the windshield is improved.

That is, in the heat exchanger 5 installed in the inside/outside air two-passage unit, refrigerant conducted into the downstream side header 11 from the inlet pipe with high temperature and high pressure exchanges heat with high temperature (room temperature of, for example, 25° C.) at an inlet side, first. After that, refrigerant with intermediate temperature and high pressure having intermediate temperature and high pressure exchanges heat with low temperature (outside temperature of, for example, −20° C.) outside air at an outlet side. Accordingly, refrigerant does not lose a large amount of heat thereof by heating high-temperature inside air so that it can sufficiently heat low-temperature outside air by exchanging heat with outside air.

The heat exchange 5 flows refrigerant therein to form an opposed flow with respect to the air flow direction in the first and second core portions 6, 7. Accordingly, inside and outside airs are heated by refrigerant flowing in the second half and fourth half groups of tubes in the first and second core portions 6, 8 first. After that, inside air and outside air are further heated by refrigerant flowing in the first half and third half groups of tubes and having a temperature higher than that in the second half and fourth half groups of tubes.

Therefore, a temperature efficiency ratio when heat exchange between air and refrigerant is performed is increased, resulting in prominent improvement of the heating performance for heating inside the compartment. This effect appears more clearly when the heat exchanger 5 is used as a gas cooler in a $CO_2$ cycle, in which a heat exchanging efficiency is improved by increasing a difference in temperature between air and refrigerant flowing therein.

(Second Embodiment)

Figure 3:
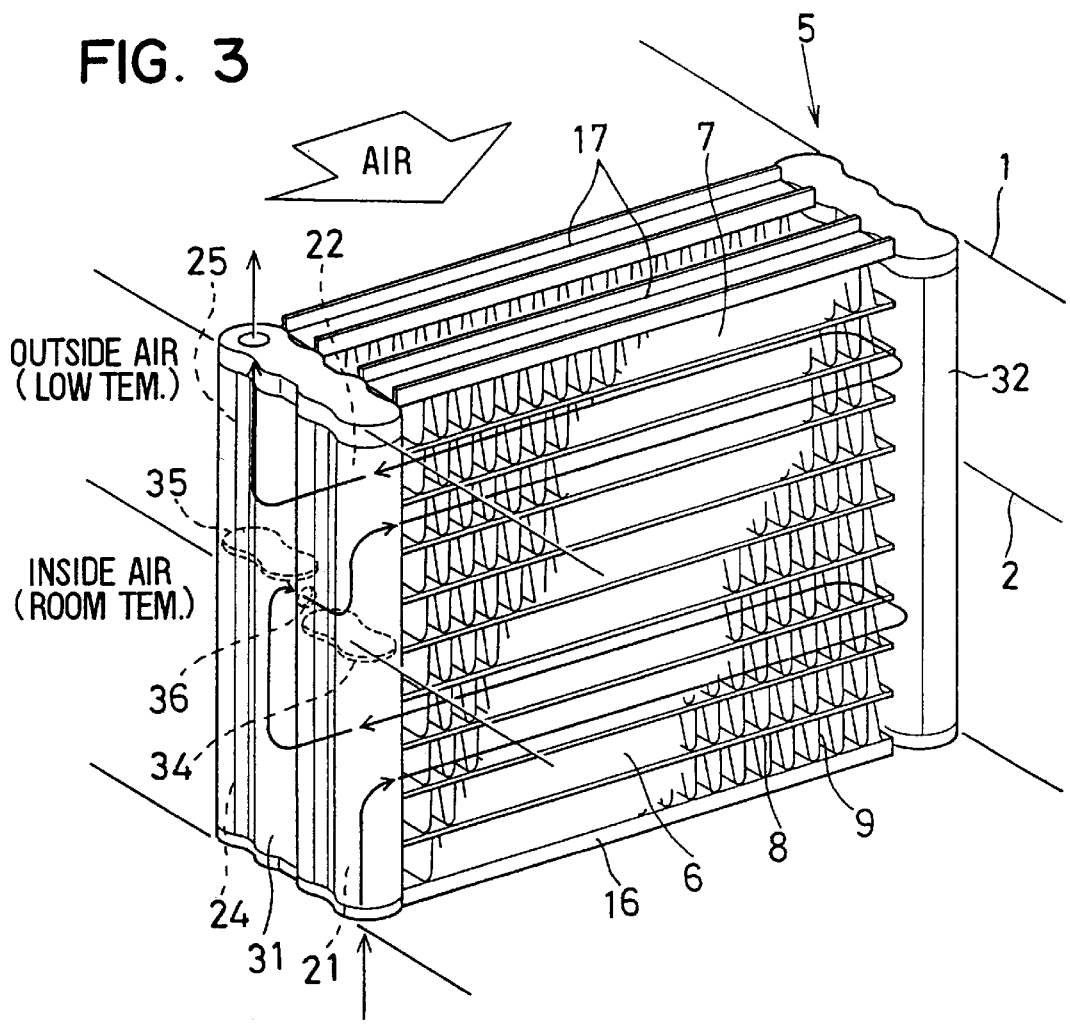
FIG. 3 is a perspective view showing a main structure of an inside/outside two-passage unit in a second preferred embodiment.
Figure 4:
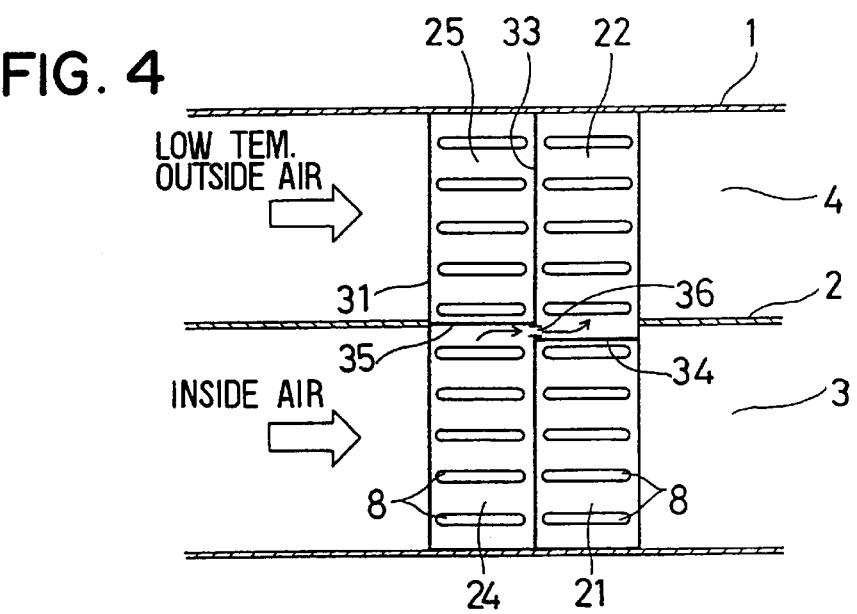
FIG. 4 is a cross-sectional view showing an integrated header of a heat exchanger in the second embodiment.
Figure 5:
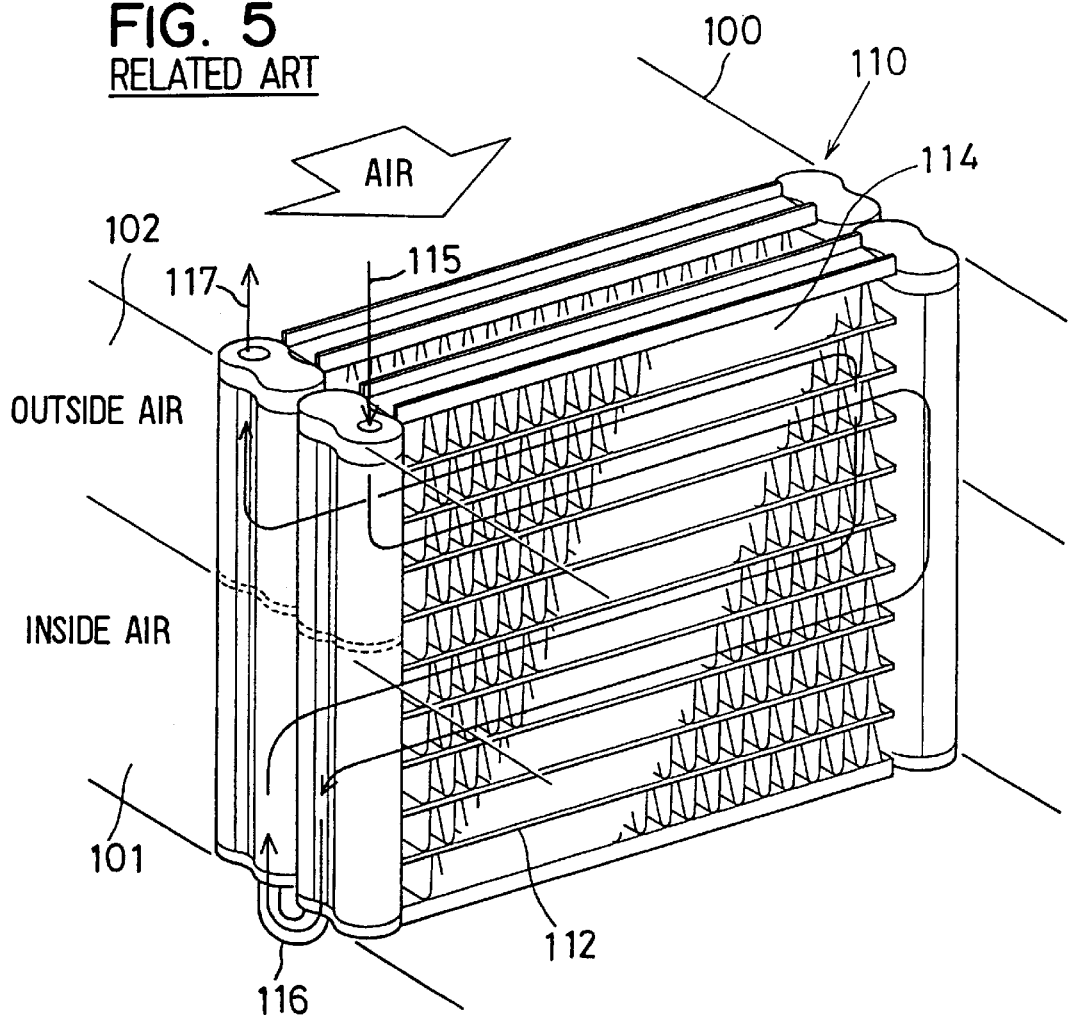
FIG. 5 is a perspective view showing a main structure of an inside/outside air two-passage unit according to a related art.
Figure 6:
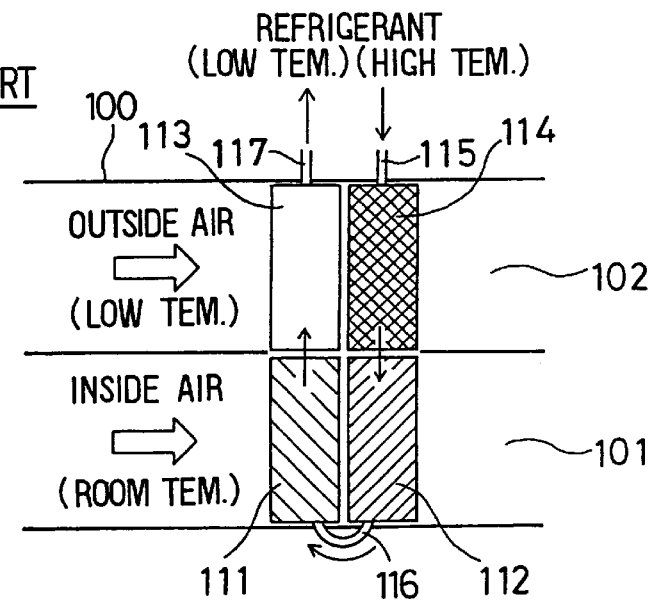
FIG. 6 is a schematic view showing a refrigerant flow direction in a heat exchanger according to the related art.

A second preferred embodiment of the present invention is explained with reference to FIGS. 3 and 4, in which the same parts and components as those in the first embodiment are indicated by the same reference numerals.

A heat exchange 5 in the second embodiment is composed of a heat exchanger body including a first core portion 6 and a second core portion 7, and integrated headers 31, 32. The integrated header 31 is formed by integrating a pair of downstream side and upstream side headers, and is connected to an end portion in the width direction of the heat exchanger body. Likewise, the integrated header 32 is formed by integrating a pair of downstream side and upstream side headers, and is connected to the other end portion in the width direction of the heat exchanger body.

An inner space of the integrated header 31 is partitioned by a separator (partition wall) 33 into a downstream side tank portion and an upstream side tank portion. The downstream side tank portion is further divided by a separator 34 into a first inlet chamber 21 communicating with inlet portions of a first half group of tubes, and a second inlet chamber 22 communicating with inlet portions of a third half group of tubes. The upstream side tank portion is further divided by a separator 35 into a first outlet chamber 24 communicating with outlet portions of a second half group of tubes, and a second outlet chamber 25 communicating with outlet portions of a fourth half group of tubes.

In the second embodiment, the air downstream side separator 34 is positioned not to face the air upstream side separator 35 with the separator 33 interposed therebetween. Further, a communication hole (communication passage) 36 is formed in the separator 33 between the air downstream side and air upstream side separators 34 and 35. Specifically, the air downstream side separator 34 is shifted from the center of one of the tubes 8 in the height direction thereof to be positioned at a lower end side of the one of the tubes 8. The air upstream side separator 35 is shifted from the center of the one of the tubes 8 in the height direction to be positioned at an upper end side of the one of the tubes 8.

An inner space of the integrated header 32 is divided by a separator (not shown) into a first intermediate chamber (not shown) communicating with outlet portions of the first half group of tubes and inlet portions of the second half group of tubes, and a second intermediate chamber (not shown) communicating with outlet portions of the third half group of tubes and inlet portions of the fourth half group of tubes.

When communication pipes are used as in the first embodiment, refrigerant can flow in the first and second core portions 6, 7 while forming an opposed flow with respect to either of the inside air flow direction and the outside air flow direction. However, it is not always necessary to adopt the communication pipes. In the second embodiment shown in FIGS. 3 and 4 not adopting the communication pipes, mountability of the heat exchanger into the inside/outside air two-passage unit is improved as compared to that in the first embodiment, in which the communication pipes protrude from the headers. Further, a number of parts constituting the heat exchanger 5 is reduced, thereby suppressing an increase in manpower for assembling the heat exchanger.

While the present invention has been shown and described with reference to the foregoing preferred embodiments, it will be apparent to those skilled in the art that changes in form and detail may be made therein without departing from the scope of the invention as defined in the appended claims.

For example, the present invention is applied to the heat exchanger 5 such as an interior condenser or an interior gas cooler for heating air by exchanging heat between air and refrigerant. However, the present invention may be applied to a heat exchanger such as a heater core for heating air by exchanging heat between air and heat medium such as engine cooling water.

What is claimed is:

1. A heat exchanger for an inside/outside air two-passage unit having a first air passage and a second air passage, in which inside air and outside air flow separately, the heat exchanger comprising:

a first core portion disposed in the first air passage, for exchanging heat between thermal medium flowing therein and the inside air flowing in the first air passage, the first core portion having a first part and a second part communicating with the first part and disposed at a downstream side of the first part in the thermal medium flow direction, and at an upstream side of the first part in an inside air flow direction in which the inside air flows, the first core portion having a first group of tubes forming the first part in which the thermal medium flows in a first direction, and a second group of tubes forming the second part in which the thermal medium flows in a second direction opposite to the first direction, the first and second directions being approximately perpendicular to the inside air flow direction;

a second core portion disposed in the second air passage, for exchanging heat between the thermal medium flowing therein and the outside air flowing in the second air passage, the second core portion being disposed at a downstream side of the first core portion in a thermal medium flow direction in which the thermal medium flows, the second core portion having a third part and a fourth part communicating with the third part and disposed at a downstream side of the third part in the thermal medium flow direction and at an upstream side of the third part in an outside air flow direction in which the outside air flows, the second core portion having a third group of tubes forming the third part in which the thermal medium flows in a third direction, and a fourth group of tubes forming the fourth part in which the thermal medium flows in a fourth direction opposite to the third direction, the third and fourth directions being approximately perpendicular to the outside air flow direction;

a downstream side header connected to an end of the first group of tubes and to an end of the third group of tubes, the downstream side header defining therein a first inlet chamber communicating with the first group of tubes for conducting the thermal medium into the first group of tubes, and a second inlet chamber communicating with the third group of tubes for conducting the thermal medium into the third group of tubes; and an upstream side header connected to an end of the second group of tubes and to an end of the fourth group of tubes, the upstream side header defining therein a first outlet chamber communicating with the second group of tubes for receiving the thermal medium discharged from the second group of tubes, and a second outlet chamber communicating with the fourth group of tubes for receiving the thermal medium discharged from the fourth group of tubes.

2. The heat exchanger of claim 1, wherein:

the downstream side header and the upstream side header are integrated with each other; and an inside space of the downstream side header having the first inlet chamber and the second inlet chamber is separated from an inside space of the upstream side header having the first outlet chamber and the second outlet chamber by a partition member having a communication passage through which the thermal medium flows from the first outlet chamber into the second inlet chamber.

3. A heat exchanger for exchanging heat with first air and second air respectively flowing in a first air passage and a second air passage, the heat exchanger comprising:

a first group of tubes disposed in the first air passage for exchanging heat between thermal medium flowing therein in a thermal medium flowing direction and the first air flowing in the first air passage in a first air flow direction;

a second group of tubes disposed in the first air passage at an upstream side of the first group of tubes in the first air flow direction, the second group of tubes being for exchanging heat between the first air and the thermal medium flowing therein after passing through the first group of tubes;

a third group of tubes disposed in the second air passage for exchanging heat between the second air flowing in the second air passage in a second air flow direction and the thermal medium flowing therein after passing through the second group of tubes; and a fourth group of tubes disposed in the second air passage at an upstream side of the third group of tubes in the second air flow direction, the fourth group of tubes being for exchanging heat between the second air and the thermal medium flowing therein after passing through the third group of tubes, wherein;

the first group of tubes is stacked with the third group of tubes; and the second group of tubes is stacked with the fourth group of tubes and faces the first group of tubes in the first air flow direction.

4. The heat exchanger of claim 3, wherein the thermal medium flow direction in the first group of tubes is opposed to that in the second group of tubes, and is the same as that in the third group of tubes.

5. The heat exchanger of claim 3, wherein the first air has a temperature higher than that of the second air.

* * * * *